Figure 1:
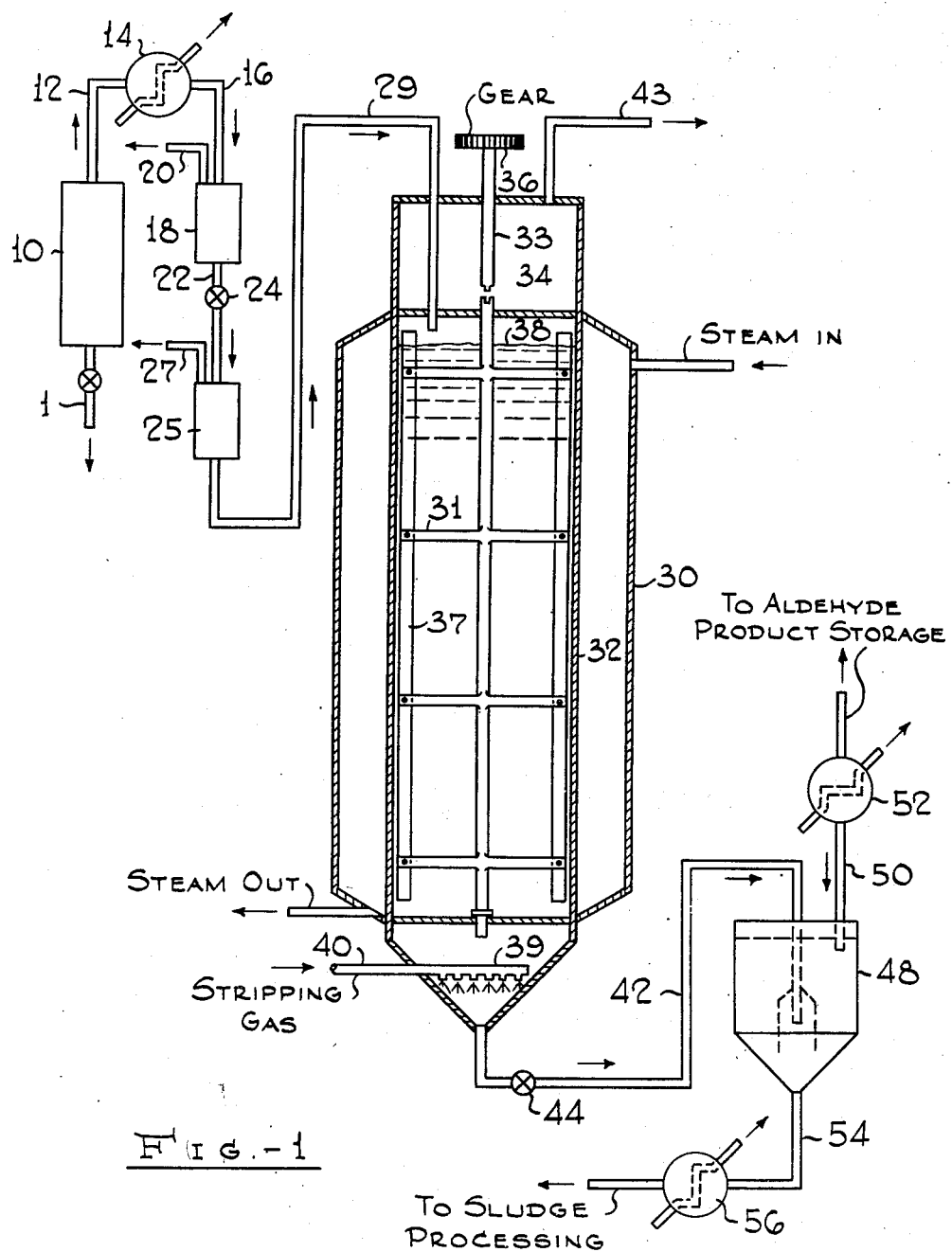
Figure 2:
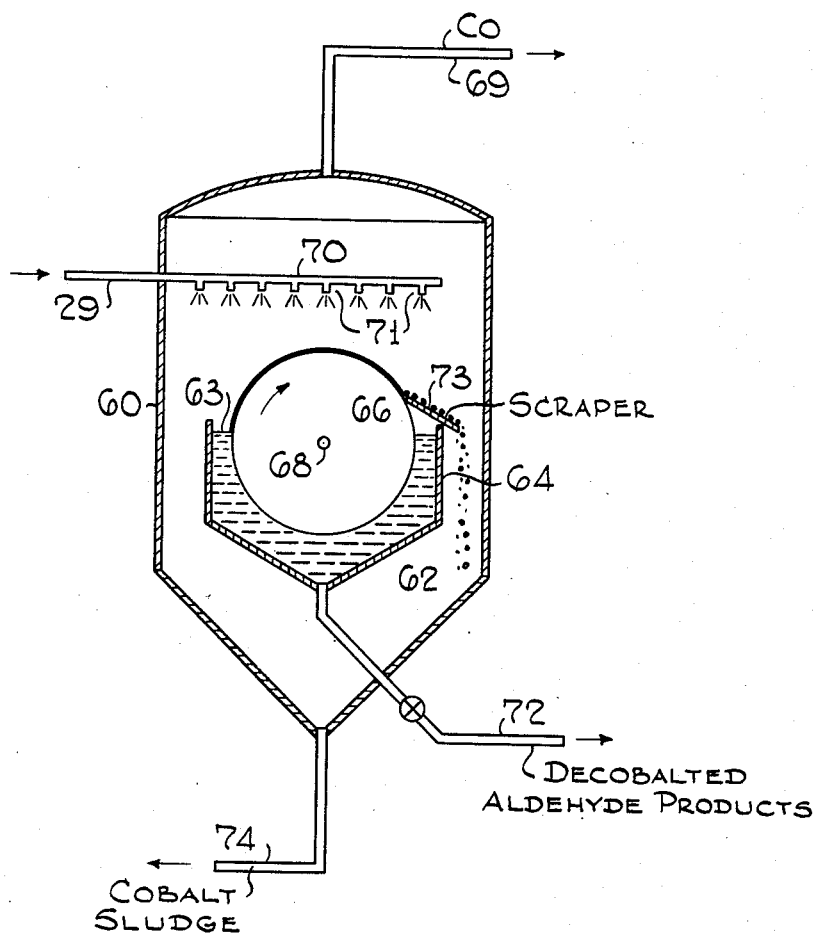

Dec. 7, 1954  W. M. SMITH ET AL  2,696,506
SYNTHESIS OF OXYGENATED ORGANIC COMPOUNDS
Filed Nov. 4, 1949  2 Sheets-Sheet 2

Warren M. Smith
John D. Koontz  Inventors

By J. Cashman Attorney

2,696,506

SYNTHESIS OF OXYGENATED ORGANIC COMPOUNDS

Warren M. Smith and John D. Koontz, Baton Rouge, La., assignors to Standard Oil Development Company, a corporation of Delaware Application November 4, 1949, Serial No. 125,482

7 Claims. (Cl. 260—604)

The present invention relates to an improved synthesis process for the production of oxygenated organic compounds by reacting organic compounds having an olefinic double bond with gas mixtures containing carbon monoxide and hydrogen at high pressures and elevated temperatures in the presence of suitable catalysts. More particularly, the invention is concerned with an improved method for removing dissolved metal carbonyl and carbon monoxide from the oxygenated synthesis product prior to storage or further treatment, such as catalytic hydrogenation.

The synthesis of oxygenated organic compounds from olenfinic compounds and mixtures of CO and $H_2$ is well known in the art. The olefinic starting material is reacted in the liquid state with CO and $H_2$ in the presence of a metal catalyst, usually an iron group metal catalyst such as a suitable cobalt compound. The reaction product consists essentially of organic carbonyl compounds, mainly aldehydes having one carbon atom more per molecule than the olefinic feed material. The oxygenated product may be hydrogenated in a second catalytic stage to convert the aldehydes to the corresponding alcohols.

Practically all types of organic compounds having an olefinic double bond may be used as the starting material, including aliphatic olefins and diolefins, cyclo-olefins, aromatics with olefinic side chains, oxygenated compounds having olefinic double bonds, etc. The metal catalyst may be present as a solid or in the form of an organic salt soluble in the olefinic feedstock. Suitable reaction conditions include temperatures of about 150°–450° F., pressures of 100–300 atmospheres, hydrogen to carbon monoxide ratios of about 0.5–4.0:1, liquid feed rates of about 0.1–5.0 v./v./hr. and gas feed rates of about 1000–45,000 standard cubic feet of gas mixture per barrel of liquid olefinic feed.

Similar temperatures and pressures and conventional hydrogenation catalysts such as nickel, copper, tungsten, oxides or sulfides of Group IV and Group VIII metals, etc., may be employed in the second stage for the hydrogenation of the carbonyl compounds.

The iron group metals used as catalysts in the first stage of the process react with CO to form metal carbonyls. This is particularly true for cobalt, the preferred and most active carbonylation catalyst. This cobalt carbonyl which dissolves in the liquid oxygenated product tends to decompose under low CO partial pressures even at relatively low temperatures and very rapidly at elevated temperatures, to form free CO and insoluble metallic cobalt. Metallic cobalt so separated seriously interferes with the further processing of the oxygenated reaction product because it may cause excessive pressure drop in the equipment due to deposition of cobalt in lines and vessels and also, it may deactivate the hydrogenation catalyst of the second stage by surface deposition of cobalt. Since cobalt carbonyl slowly decomposes under low CO partial pressures even on standing at atmospheric pressure it should be removed as soon upon the formation of the oxygenated product as possible.

Prior to the present invention it has been suggested to remove cobalt carbonyl from the oxygenated product by treating with hydrogen at relatively high pressures and elevated temperatures in vessels packed with an inert solid on which the separated cobalt is deposited and from which a substantially carbonyl-free liquid product may be withdrawn, the liberated CO being removed with the hydrogen used for treating. These procedures, while effective, require relatively long residence times usually in excess of one hour in the decobalting vessel at high temperatures, conditions which are conducive to aldehyde loss by formation of higher molecular weight derivatives. In addition, difficulties due to plugging of the decobalting vessel have been encountered. When shorter residence times are employed the cobalt removal may be incomplete.

It has also been suggested that the total liquid effluent from the carbonylation stage be subjected to a thermal treatment at temperatures high enough to maintain a satisfactorily rapid rate of metal carbonyl decomposition at relatively low pressures which are not higher than required just to prevent substantial vaporization of the liquid effluent. Heat for the decobalting is supplied through surfaces forming the walls of the catalyst decomposition chamber. Thus, it has been demonstrated that heat for the decobalting may be added by means of passage of the total liquid effluent through a double pipe steam heater, wherein steam passes through the outer walls and product through the inner surfaces. Though this type of operation is initially satisfactory, it has the disadvantage that metallic cobalt formed by the decomposition of cobalt carbonyl not only is precipitated in the tube but also, tends to deposit out on the hot surfaces. Eventually this causes plugging up of the tube, which is preferably of relatively narrow dimensions to facilitate rapid heat transfer throughout the liquid passing therethrough. Because of this plugging tendency, decobalting is usually carried out in two or more interchangeable units, and the primary product is switched from one unit to another as the one on stream becomes plugged up and requires cleaning out. Removal of the deposited cobalt often is a difficult process, because during extended heating the soft cobalt metal deposit originally formed is converted into a hard scale which requires drilling to remove from the tube walls. It has also been suggested to remove the deposited metal by extracting with mineral acid or by treating with carbon monoxide. Also, as the metal builds up along the walls, heat transfer becomes increasingly less efficient, and this results in decreased carbonyl removal, which in turn means that the cobalt carbonyl will be decomposed in the hot coils in the hydrogenation system, resulting in plugging and in inactivation of the hydrogenation catalyst.

The present invention overcomes these difficulties and affords various additional advantages. These advantages, the nature of the invention, and the manner in which it is carried out, will be fully understood from the following description thereof, read with reference to the accompanying drawings which show semi-diagrammatic views of apparatus adapted to carry out the invention.

In accordance with the present invention the total liquid effluent from the primary carbonylation stage is subjected to a thermal treatment at decarbonylation temperatures while passing over a scraped heating surface. The previously dissolved gases are separated from the liquid prior to or during the thermal treatment and their removal from the liquid may, if desired, be aided by the use of a stripping gas substantially inert to the liquid product at the catalyst decomposition conditions. The cobalt metal resulting from the decomposition of the carbonyl, which normally is deposited in part on the heat transfer surface is continuously removed by a scraping device, preventing build-up of cobalt metal on the surface, thus eliminating the need of a plurality of decobalters and insuring high decobalting efficiency. Thus, in accordance with one specific embodiment of the present invention, there is employed as decobalter, a double pipe heater which is provided in the interior process wall with a rotating scraping mechanism adapted not only to remove deposited cobalt but also to maintain turbulence and thus high heat transfer rates within the liquid being decobalted.

In accordance with another specific embodiment of the invention, the liquid to be decobalted is passed to an internally steam-heated rotating drum partially or totally immersed in the aldehyde product, and the deposited cobalt scraped off the drum and segregated.

The specific conditions of temperature and pressure used in the cobalt removal process depend to a certain extent on the boiling range of the product treated. Thus, temperatures within the approximate range of 300°–400°

F., preferably 300°–350° F., and total pressures within the approximate range of 50–150 p. s. i. g. are generally suitable for primary reaction product having six or more carbon atoms per molecule. With higher carbonylation compounds, say nine or more, proportionately lower pressures may be employed.

Having set forth its general nature, the invention will best be understood from the following more detailed description in which reference will be made to the accompanying drawings.

Figure I illustrates a system wherein heat required for carbonyl removal is applied externally to a tube carrying the oxygenated product to be treated, and where inside surface is continually scraped.

Figure II is an illustration of an internal heat supply through a partially immersed rotating heat transfer surface, which surface is continually scraped.

Referring now in detail to Figure I, the system illustrated therein essentially comprises a carbonylation reactor 10, a separator 18, and a heater 30, whose functions and cooperation will be forthwith explained using the removal of cobalt carbonyl from a carbonylation reaction product having an average of 7–9 carbon atoms per molecule as an example. It should be understood however, that the system may be applied to the treatment of heavier or lighter oxygenated products containing the same or a different metal carbonyl.

In operation, the liquid olefinic feed stock having an average of about 6–8 carbon atoms per molecule and a gas mixture containing CO and $H_2$ in the approximate ratio of 1:1 are introduced through line 1 into the bottom of reactor 10. The catalyst, preferably in the form of a cobalt salt soluble in the feed, such as cobalt naphthenate, stearate, oleate, etc., may be added to the liquid feed in concentrations of from 0.1–3% by weight. If desired, reactor 10 may be provided with a bed of cobalt catalyst supported on an inert carrier such as silica gel, pumice or the like.

Reactor 10 is operated at conventional carbonylation conditions including temperatures of about 300°–400° F., pressures of about 2500–3500 pounds per square inch, a gas feed rate of about 3000–40,000 standard cubic feet per barrel of liquid feed and a liquid feed throughput of about 0.2 to 2 volumes per volume of reactor space per hour. The reaction products consisting of liquid oxygenated products containing about 0.05 to 0.3% by weight of dissolved cobalt mainly as cobalt carbonyl are removed, together with unreacted gas, through line 12, cooled to about 80°–120° F. in cooler 14 and passed through line 16 to a liquid-gas separator 18. Gas separated in separator 18 is withdrawn through line 20 and may be recycled to line 1 for reuse in reactor 10.

The liquid separated in separator 18, still at the pressure of reactor 10, is withdrawn downwardly through line 22 provided with pressure release valve 24. The liquid product is now under a low pressure of about 50–150 p. s. i. g. at which the major portion of previously dissolved gas is released. This liquid-gas mixture is separated in low-pressure separator 25 from which gas is withdrawn through line 27, and the liquid product comprising mainly aldehydes and cobalt compounds and complexes, principally cobalt carbonyl, and probably some water formed as a result of secondary reactions, such as acetal and aldol formation in reactor 10, is passed into heater 30 through line 29.

Heater 30 preferably consists of pipe 32 provided with a steam jacket as indicated in the drawing. The heater is preferably in a vertical position to facilitate water removal, as detailed below. For a commercial unit the decobalter vessel may have an inner diameter of 18 inches and a length of 18 feet, with a disengaging space 34 of about 3 feet, affording a heat transfer surface of about 70 square feet. Continuously rotating within tube 32 is scraping device 36 which may consist of one or more blades 37 revolving about a vertical axis. The blades are thin relative to the volume of the decobalter, affording ample room for the liquid to flow through 30.

Thus, for example, there may be employed, say, five blades equally spaced apart from one another about the circumference, and spaced from revolving shaft 33 by "spider" supports 31. Though each blade may measure the entire length of the decobalting surface of eighteen feet, for example, it may be desirable, from the standpoint of economy and ease of replacement, to employ blades constructed in sections of, say three feet each, which sections may then be affixed in close proximity one to another; thus, instead of a single blade of about eighteen feet in length it may be more desirable to employ three individual blades six feet long extending the length of the decobalter. It is also desirable that each blade be at least one fifth of a complete helix. The spacing between the blades and the heated wall is such as to give about 0.01 inch clearance as a maximum.

The temperature of decobalter 30 is controlled at about 300°–350° F. by steam at about 125 p. s. i. g. passing through the steam jacket. Aldehyde product containing cobalt carbonyl in solution is continuously admitted through line 29 into the top of decobalter 30, line 29 extending to a point adjacent to liquid level 38 maintained in vessel 30. A stream of inert stripping gas, preferably hydrogen, is admitted through line 40 and manifold 39 at a rate of about 50 v./v./hr. The function of this gas is not only to purge the CO resulting from the decomposition of cobalt carbonyl from the reactor but also to strip and remove water present in the decobalter feed. It has been found that when water is present during the decomposition of cobalt carbonyl in the decobalter, cobalt formate is found in the effluent from this vessel, and this cobalt salt is extremely difficult to remove from the decobalter product; if this material were to reach the coils in the hydrogenation furnace, fouling would result. Accordingly, the formation of this compound is minimized by removing substantially all the water from the feed to the decobalter. This is performed by cooperation of the rotating scraper 36 in combination with the stripping gas admitted through 40. The scraper 36 is rotated at a sufficiently high rate to provide a high degree of turbulence in tube 32, which results in efficient heat transfer from the tube walls through the body of the liquid therein and the stripping gas passing therethrough, and thereby a temperature of say 300°–350° F. is maintained. Thus the stripping gas vaporizes water present in the decobalter feed at the inlet to the decobalter.

As a further result of the high degree of turbulence obtaining in tube 32 because of the high speed of rotation of device 36, the cobalt metal resulting from the decomposition of cobalt carbonyl is precipitated in a much finer and comminuted form than if such agitation and rotation were not present. This minimizes scale formation and aids in keeping the metal in suspension.

The hold-up time in vessel 30 may be of the order of about one hour when the olefin feed rate to reactor 10 is on the order of 100 barrels per stream day. The rate of rotation of scraper 36 is about 30 R. P. M.

As indicated, stripping gas, water vapor, and light ends may be withdrawn from disengaging space 34 through line 43 and passed to coolers, water traps, etc., for further processing if desired. The liquid in tube 32, which is continuously being decobalted, and which carries in suspension, the bulk of the precipitated cobalt, is passed downwardly. As disclosed previously, because of the high rate of agitation within 32, the decomposed cobalt metal is obtained as relatively fine particles, and these are readily removed from the tube walls by means of scraper 36.

The mixture of decobalted material and suspended solids now substantially free of cobalt carbonyl and, as a result of low CO partial pressure likewise substantially free of dissolved carbon monoxide, is passed from the conical bottom of decobalter 30 through line 42 and level control valve 44 to settler 48 wherein the suspension is separated into a substantially cobalt free liquid aldehyde phase and a thickened cobalt sludge. The aldehyde product containing in solution less than about 0.05% by weight of cobalt compounds is withdrawn from settler 48 through line 50, cooled to 80°–120° F. in cooler 52 and is then suitable for further processing. The thickened cobalt sludge is withdrawn downwardly through line 54 to cooler 56 wherein it is cooled to 80°–120° F. and is then suitable for utilization or processing in any manner desired.

Another embodiment of the present invention designed to avoid plugging difficulties is illustrated in a simplified manner in Figure II, which shows merely the decobalting means proper, all other system elements which may be substantially the same as those described in connection with Figure I having been omitted.

Decobalter 60 consists essentially of two chambers, an inner chamber 64, and an outer chamber 62. Within 64 there is a revolving drum 66, which is equipped with steam line 68. Stationary scraper 73 is attached to the top of one of the walls of chamber 62 and disposed so as to contact the surface length of drum 66. Manifold 70 and conduits 72 and 74 are also provided. The cooperation of these elements is detailed below.

Turning now to Figure II, liquid oxygenated product containing dissolved cobalt carbonyl is supplied continually to the top of decobalter 60 through line 29 (Figure I) at a temperature of about 80°–120° F. and a pressure of about 50 to 250 p. s. i. g. The liquid is passed through manifold 70 and is sprayed at a plurality of inlet points 71 upon rotating drum 66. The latter is rotating at a velocity of about 0.1 to 5 R. P. M. Within vessel 64 a liquid level 63 is maintained. The temperature of the drum is maintained about 300°–450° F. by steam passing in and out through ports 68. Drum 66 is preferably only partially submerged in the liquid within vessel 64 though, if desired, it may be totally submerged. Because of the high temperature maintained on the surface of the drum, the cobalt carbonyl is readily decomposed on the surface to CO and metallic cobalt, which latter forms a deposit on the drum, which deposit is scraped off by scraping device 73. The CO is withdrawn through line 69. The cobalt removed by the scraper passes to the compartment formed by inner vessel 64 and outer vessel 62. Cobalt that is not immediately deposited upon drum 66 but that passes along in suspension or solution with the liquid product into the body of liquid in 64 deposits on the submerged portion of the drum, because of the high surface heat thereof; the thus deposited material is scraped off along with the material depositing immediately upon contact of the fresh decobalter feed with drum 66.

The feed to decobalter 60 is at the rate of about 0.1 to 3 v./v./hr., and the residence time within the decobalter is about one hour. The decobalted material is withdrawn from inner vessel 64 through conduit 72, and the cobalt particles from outer vessel 62 through conduit 74, to be processed in any manner desired. Thus, it may be desirable to pass the decobalted liquid to a tower (not shown) wherein stripping gas may be added to remove CO.

The invention may be subject to numerous modifications. Thus scraping may be either continuous or intermittent. It may be desirable under certain circumstances to scrape the deposited metal directly into the liquid being decobalted, and to pass the suspension to a settler or thickener, as in the previous example. Other modifications obvious to those skilled in the art are within the scope of the invention.

What is claimed is:

1. In a carbonylation process wherein olefinic compounds are contacted in an initial carbonylation zone with carbon monoxide and hydrogen in the presence of a cobalt carbonylation catalyst under conditions of temperature and pressure conducive to production of aldehydes containing one more carbon atom than said olefinic compounds, and wherein at least a portion of said cobalt is converted into cobalt carbonyl, and wherein a reaction product comprising aldehydes and cobalt carbonyl is withdrawn from said reaction zone and transferred to a catalyst decomposition and removal zone, the improvement which comprises continuously passing said product in contact with an externally heated heat transfer surface disposed within said catalyst decomposition zone, whereby cobalt carbonyl is decomposed into carbon monoxide and metallic cobalt, maintaining a high degree of turbulence within said zone, depositing a layer of metallic cobalt in a high degree of comminution upon said surface, removing said deposited cobalt layer from said surface substantially as soon as it is formed and recovering cobalt from said catalyst removal zone.

2. The process of claim 1 wherein cobalt metal and aldehyde product are withdrawn concomitantly as a single stream from said catalyst decomposition zone.

3. The process of claim 1 wherein cobalt metal and aldehyde product are withdrawn concomitantly as separate streams from said catalyst decomposition zone.

4. The process of claim 1 wherein said catalyst decomposition zone comprises an externally heated narrow path.

5. The process of claim 4 wherein deposited metal is continuously removed from said surface by scraping said surface in a horizontally rotary motion.

6. The process of claim 1 wherein said heat transfer surface within said catalyst decomposition zone revolves about a horizontal axis.

7. The process of claim 6 wherein said revolving surface is at least partially immersed in reaction product within said catalyst removal zone.

References Cited in the file of this patent

UNITED STATES PATENTS

| Number | Name | Date |
|---|---|---|
| 629,536 | Adiassewich | July 25, 1899 |
| 1,376,713 | McCabe | May 3, 1921 |
| 1,465,752 | Yates | Aug. 21, 1923 |
| 1,540,986 | Halle | June 9, 1925 |
| 1,690,243 | Parrish | Nov. 6, 1928 |
| 1,906,534 | Burke | May 2, 1933 |
| 2,407,494 | Hartvigsen | Sept. 10, 1946 |
| 2,504,682 | Harian | Apr. 18, 1950 |
| 2,596,920 | Smith et al. | May 13, 1952 |

OTHER REFERENCES

Hasche et al., "U. S. Naval Technical Mission in Europe," Technical Report 248–45, page 122 (September 1945).

FIAT, Final Report #1000, "The Oxo Process," Dec. 26, 1947, pages 8 and 10.